United States Patent
Zhang et al.

(10) Patent No.: US 10,055,246 B2
(45) Date of Patent: Aug. 21, 2018

(54) METHOD AND DEVICE FOR DATA FLOW MIGRATION DURING VIRTUAL MACHINE MIGRATION

(71) Applicant: HUAWEI TECHNOLOGIES CO., LTD., Shenzhen (CN)

(72) Inventors: Liang Zhang, Nanjing (CN); Yuming Xie, Nanjing (CN); Jinwei Xia, Nanjing (CN); Jun Wu, Nanjing (CN); Fan Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 75 days.

(21) Appl. No.: 15/279,993

(22) Filed: Sep. 29, 2016

(65) Prior Publication Data

US 2017/0017514 A1    Jan. 19, 2017

Related U.S. Application Data

(63) Continuation of application No. PCT/CN2015/074839, filed on Mar. 23, 2015.

(30) Foreign Application Priority Data

Mar. 31, 2014    (CN) .......................... 2014 1 0127024

(51) Int. Cl.
*G06F 9/46* (2006.01)
*G06F 9/455* (2018.01)

(52) U.S. Cl.
CPC .. *G06F 9/45558* (2013.01); *G06F 2009/4557* (2013.01)

(58) Field of Classification Search
None
See application file for complete search history.

(56) References Cited

U.S. PATENT DOCUMENTS 9,197,489 B1 * 11/2015 Vincent ................. H04L 67/148
2008/0222375 A1   9/2008 Kotsovinos et al.
(Continued)

FOREIGN PATENT DOCUMENTS

| CN | 102724277 | 10/2012 |
| CN | 102884763 | 1/2013 |

OTHER PUBLICATIONS

International Search Report, dated May 25, 2015, in International Application No. PCT/CN2015/074839 (11 pp.).
(Continued)

*Primary Examiner* — Wissam Rashid
(74) *Attorney, Agent, or Firm* — Staas & Halsey LLP

(57) ABSTRACT

A data flow migration method and device are disclosed. When migration between a source virtual machine and a target virtual machine is started, determining a silent time used for processing data flow migration; and receiving, within the silent time, a data flow packet sent by a switching node; and sending the data flow packet to the target virtual machine according to the data flow packet and a data flow migration policy. In this way, the silent time is used, a newly arrived data flow is redirected, and the newly arrived data flow is directly sent to the target virtual machine according to the data flow migration policy, which avoids migration of the newly arrived data flow. Therefore, data flows that arrive at the source virtual machine are on the decrease, and system migration performance is effectively improved.

6 Claims, 3 Drawing Sheets

(56) References Cited

U.S. PATENT DOCUMENTS

| | | |
|---|---|---|
| 2013/0212241 A1 | 8/2013 | Kang et al. |
| 2013/0212577 A1 | 8/2013 | Nayak et al. |
| 2014/0119379 A1* | 5/2014 | Liang .................. H04L 12/4625 370/401 |
| 2015/0052254 A1 | 2/2015 | Zhao |

OTHER PUBLICATIONS

Extended European Search Report, dated Jan. 25, 2017, in European Application No. 15772816.3 (7 pp.).

Clark, C. et al., *Live Migration of Virtual Machines*, NSDI '05: 2nd Symposium on Networked Systems Design & Implementation, pp. 273-286).

International Search Report dated May 25, 2015 in corresponding International Application No. PCT/CN2015/074839.

* cited by examiner

METHOD AND DEVICE FOR DATA FLOW MIGRATION DURING VIRTUAL MACHINE MIGRATION

CROSS-REFERENCE TO RELATED APPLICATIONS

This application is a continuation of International Application No. PCT/CN2015/074839, filed on Mar. 23, 2015, which claims priority to Chinese Patent Application No. 201410127024.3, filed on Mar. 31, 2014. The disclosures of the aforementioned applications are hereby incorporated by reference in their entireties.

TECHNICAL FIELD

This application relates to the field of cloud computing technologies, and in particular, to a data flow migration method and device.

BACKGROUND

As an important technology that supports cloud computing, a virtualization technology has become a basic resource management technology in a data center or a cloud environment.

Network Function Virtualization (NFV) is an abstract representation method of computer resources, and runs a network function in a general-purpose computer. The network function virtualization can implement sharing of the computer resources, and allow multiple virtual network function (VNF) instances (for example, a virtual machine (VM)) to be parallelly run in a physical computer, to implement efficient use of physical resources.

Virtual machine migration is one of important technologies of the network function virtualization. Live migration of a virtual machine, also referred to as in-service migration of a virtual machine, means that when a migration operation is started between a source virtual machine and a target virtual machine, an service of the source virtual machine is not interrupted. That is, in an initial phase of live migration, the service still runs on the source virtual machine. As the migration operation between the source virtual machine and the target virtual machine is in progress, when the target virtual machine has sufficient resources for system running, the service run on the source virtual machine is switched, after a short switching time, to the target virtual machine for continuous running. In this case, an operation of the service on the source virtual machine is terminated. Because the service switching time is short, a user is unaware of a pause that occurs in execution of the service in a live migration process.

Generally, it is relatively common to use a live migration manner between virtual machines. Currently, a main focus of research and application of live migration is on a local area network environment, and memory data and a central processing unit (CPU) status are main data that needs to be migrated in the live migration process.

The memory data refers to data in a memory of a virtual machine, may be data required for computing in a CPU, may be data that needs to be stored in a storage device, or the like, and generally is stored in units of pages.

The CPU status refers to a running process, a started service, and the like in a CPU of a VM.

Phases of migrating the memory data and the CPU status between virtual machines include a push-copy phase, a stop-and-copy phase, and a pull phase.

Push-copy phase: When migration is started between a source virtual machine and a target virtual machine, the source virtual machine continues to run, and a virtual machine monitor (VMM) copies, to the target virtual machine, memory data that is generated in the source virtual machine and memory data that is being modified in the source virtual machine.

To ensure consistency of memory data between the source virtual machine and the target virtual machine, the source virtual machine receives to-be-processed data in a process of pushing and copying the memory data, and processes the data, resulting in a change of the copied memory data. In this case, the VMM sends changed memory data to the target virtual machine.

Stop-and-copy phase: When the source virtual machine stops running, the VMM copies the remaining changed memory data to the target virtual machine.

Pull phase: After the target virtual machine starts running, when processing received data, the target virtual machine finds that the memory data lacks memory data required for processing the data, and in this case, obtains, by means of replication from the source virtual machine in a memory data missing manner, the memory data required for processing the data.

A stop-and-copy manner and a pull manner belong to a supplementary manner of a push-copy manner. In live migration, memory data migration between the source virtual machine and the target virtual machine is mainly implemented in the push-copy manner, which also means that the source virtual machine sends changed memory data to the target virtual machine, provided that the memory data in the source virtual machine changes.

It can be learned that, in a live migration manner used in current virtual machine migration, the memory data in the source virtual changes, provided that the source virtual machine receives the to-be-processed data, and therefore a quantity of times the source virtual machine sends the changed memory data to the target virtual machine is increased, and performance of memory data migration between the source virtual machine and the target virtual machine is affected.

SUMMARY

In view of this, this application provide a data flow migration method and device, to resolve a current problem that migration performance decreases because memory data is frequently sent during application of live migration.

According to a first aspect, a data flow migration method is provided, including:
 when migration between a source virtual machine and a target virtual machine is started, determining a silent time used for processing data flow migration;
 receiving, within the silent time, a packet that includes a data flow identifier and is sent by a switching node; and
 sending the packet to the target virtual machine according to the data flow identifier that is included in the received packet and a data flow migration policy.

With reference to the first aspect, in a first possible implementation manner of the first aspect, the sending the packet to the target virtual machine according to the data flow identifier that is included in the received packet and a data flow migration policy includes:
 determining whether the data flow identifier included in the received packet exists in a first data flow status table, where the first data flow status table includes a data flow identifier of a data flow being processed by the source virtual machine; and sending the packet to the target virtual machine when a result of the determining is that the data flow identifier included in the received packet does not exist in the first data flow status table.

With reference to the first possible implementation manner of the first aspect, in a second possible implementation manner of the first aspect, the method further includes:

sending the packet to the source virtual machine when a result of the determining is that the data flow identifier included in the received packet exists in the first data flow status table.

With reference to the first aspect and either of the first possible implementation manner of the first aspect and the second possible implementation manner of the first aspect, in a third possible implementation manner of the first aspect, the method further includes:

adding the data flow identifier included in the packet to a second data flow status table, where the second data flow status table includes a data flow identifier of a data flow being processed by the target virtual machine.

With reference to the third possible implementation manner of the first aspect, in a fourth possible implementation manner of the first aspect, after the sending the packet to the source virtual machine, the method further includes:

when the silent time ends, determining an identifier of a data flow on which processing is not completed by the source virtual machine; and moving the determined data flow identifier to the second data flow status table, and migrating memory data that is associated with the data flow identifier and is included in the source virtual machine to the target virtual machine.

According to a second aspect, a data flow migration device is provided, including:

a determining module, configured to: when migration between a source virtual machine and a target virtual machine is started, determine a silent time used for processing data flow migration;

a receiving module, configured to receive, within the silent time determined by the determining module, a packet that includes a data flow identifier and is sent by a switching node; and a sending module, configured to send the packet to the target virtual machine according to the data flow identifier that is included in the packet received by the receiving module and a data flow migration policy.

With reference to the second aspect, in a first possible implementation manner of the second aspect, the sending module is specifically configured to: determine whether the data flow identifier that is included in the packet received by the receiving module exists in a first data flow status table, where the first data flow status table includes a data flow identifier of a data flow being processed by the source virtual machine; and send the packet to the target virtual machine when a result of the determining is that the data flow identifier included in the received packet does not exist in the first data flow status table.

With reference to the first possible implementation manner of the second aspect, in a second possible implementation manner of the second aspect, the sending module is further configured to send the packet to the source virtual machine when a result of the determining is that the data flow identifier that is included in the packet received by the receiving module exists in the first data flow status table.

With reference to the second aspect and either of the first possible implementation manner of the second aspect and the second possible implementation manner of the second aspect, in a third possible implementation manner of the second aspect, the migration device further includes:

a modifying module, configured to add the data flow identifier that is included in the packet received by the receiving module to a second data flow status table, where the second data flow status table includes a data flow identifier of a data flow being processed by the target virtual machine.

With reference to the third possible implementation manner of the second aspect, in a fourth possible implementation manner of the second aspect, the migration device further includes:

a migration module, configured to: after the sending module sends the packet to the source virtual machine, when the silent time determined by the determining module ends, determine an identifier of a data flow on which processing is not completed by the source virtual machine; and move the determined data flow identifier to the second data flow status table, and migrate memory data that is associated with the data flow identifier and is included in the source virtual machine to the target virtual machine.

According to a third aspect, a server is provided, and the server includes a processor, an interface, and a memory, where the processor, the interface, and the memory are connected through a bus, where the interface is configured to communicate with an external device;

the memory is configured to store a program; and the processor is configured to execute the program stored in the memory, and execute the program in the following manner:

when migration between a source virtual machine and a target virtual machine is started, determining a silent time used for processing data flow migration; receiving, within the silent time, a packet that includes a data flow identifier and is sent by a switching node; and sending the packet to the target virtual machine according to the data flow identifier that is included in the received packet and a data flow migration policy.

With reference to the third aspect, in a first possible implementation manner of the third aspect, the sending the packet to the target virtual machine according to the data flow identifier that is included in the received packet and a data flow migration policy includes:

determining whether the data flow identifier included in the received packet exists in a first data flow status table, where the first data flow status table includes a data flow identifier of a data flow being processed by the source virtual machine; and sending the packet to the target virtual machine when a result of the determining is that the data flow identifier included in the received packet does not exist in the first data flow status table.

With reference to the first possible implementation manner of the third aspect, in a second possible implementation manner of the third aspect, the processor is further configured to send the packet to the source virtual machine when a result of the determining is that the data flow identifier included in the received packet exists in the first data flow status table.

With reference to the third aspect and either of the first possible implementation manner of the third aspect and the second possible implementation manner of the third aspect, in a third possible implementation manner of the third aspect, the processor is further configured to add the data flow identifier included in the packet to a second data flow status table, where the second data flow status table includes a data flow identifier of a data flow being processed by the target virtual machine; and the memory is further configured to store the second data flow status table.

With reference to the third possible implementation manner of the third aspect, in a fourth possible implementation manner of the third aspect, the processor is further configured to: after sending the packet to the source virtual machine, when the silent time ends, determine an identifier of a data flow on which processing is not completed by the source virtual machine; and move the determined data flow identifier to the second data flow status table, and migrate memory data that is associated with the data flow identifier and is included in the source virtual machine to the target virtual machine.

According to this application, when migration between a source virtual machine and a target virtual machine is started, a silent time used for processing data flow migration is determined; a data flow packet sent by a switching node is received within the silent time; and the data flow packet is sent to the target virtual machine according to the data flow packet and a data flow migration policy. In this way, the silent time is used, a newly arrived data flow is redirected, and the newly arrived data flow is directly sent to the target virtual machine according to the data flow migration policy, which avoids migration of the newly arrived data flow. Therefore, data flows that arrive at the source virtual machine are on the decrease, an amount of memory data migrated between the source virtual machine and the target virtual machine is reduced, efficiency of data flow migration increases, and system migration performance is effectively improved.

DESCRIPTION OF EMBODIMENTS

To achieve the objective of the present invention, the embodiments of the present invention provide a data flow migration method and device, when migration between a source virtual machine and a target virtual machine is started, a silent time used for processing data flow migration is determined; a data flow packet sent by a switching node is received within the silent time; and the data flow packet is sent to the target virtual machine according to the data flow packet and a data flow migration policy. In this way, the silent time is used, a newly arrived data flow is redirected, and the newly arrived data flow is directly sent to the target virtual machine according to the data flow migration policy, which avoids migration of the newly arrived data flow. Therefore, data flows that arrive at the source virtual machine are on the decrease, an amount of memory data migrated between the source virtual machine and the target virtual machine is reduced, efficiency of data flow migration increases, and system migration performance is effectively improved.

The embodiments of the present invention may be applied to a migration architecture that includes a control device, a source virtual machine, and a target virtual machine, where the control device may include a management device and a switching node; or may be applied to a migration architecture that includes a management device, a switching node, a source virtual machine, and a target virtual machine.

The following describes in detail the embodiments of the present invention with reference to the accompanying drawings in the specification.

Embodiment 1

Figure 1:
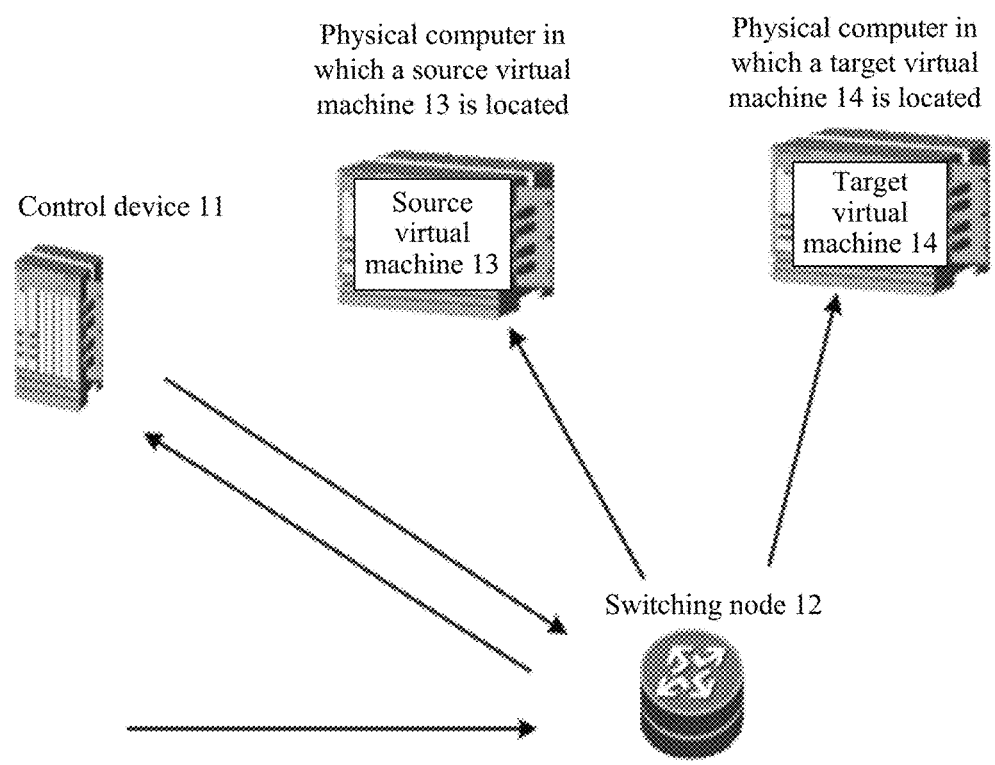
FIG. 1 is a schematic structural diagram of a data flow migration system according to Embodiment 1 of the present invention.

As shown in FIG. 1, FIG. 1 is a schematic structural diagram of a data flow migration system according to Embodiment 1 of the present invention. The system includes a control device 11, a switching node 12, a source virtual machine 13, and a target virtual machine 14.

The control device 11 is configured to: when migration between the source virtual machine 13 and the target virtual machine 14 is started, determine a silent time used for processing data flow migration; receive, within the silent time, a packet that includes a data flow identifier and is sent by the switching node 12; and send the packet to the target virtual machine 14 according to the data flow identifier that is included in the received packet sent by the switching node 12 and a data flow migration policy.

The switching node 12 is configured to send the received packet that includes the data flow identifier to the control device 11.

The target virtual machine 14 is configured to process the received packet when receiving the packet.

The control device 11 is specifically configured to: when it is determined to start migration between the source virtual machine and the target virtual machine, determine the silent time used for processing data flow migration.

The silent time may be duration, such as 5 s or 10 s; or may be a time interval, for example, a current moment to a time point; an implementation form of the silent time is not limited herein.

The silent time may be determined according to experiment data, or may be determined according to an actual migration requirement.

The control device 11 is further configured to: after determining the silent time, send the silent time to a virtual machine monitor that manages the source virtual machine, where the virtual machine monitor that manages the source virtual machine does not execute a migration operation within the silent time, that is, does not start a push-copy operation.

Because a data flow includes a short-time data flow and a long-time data flow, when receiving the silent time, the source virtual machine waits for disconnection of a short-time connection, and eliminates metadata that is associated with the short-time data flow and is in a memory (where the metadata includes attribute information of the data flow, and after the elimination is completed, it indicates that processing on the short-time data is completed), which effectively reduces memory data that needs to be migrated.

The short-time data flow refers to a data flow on which processing can be completed within a short time, and the long-time data flow refers to a data flow on which processing needs to be completed in a longer time period.

The control device 11 is specifically configured to receive, within the silent time, the packet that includes the data flow identifier and is sent by the switching node 12.

The data flow identifier may be one or more of a source address, a target address, a source port number, a target port number, or a protocol number of a data flow, for example, a Stream#1 or a Port80.

The packet that includes the data flow identifier and is sent by the switching node 12 may be classified into the following two types:

A first type is that before the silent time, the switching node has already sent the first packet of a data flow corresponding to the data flow identifier to the source virtual machine, and after the source virtual machine receives the silent time, the switching node receives a subsequent packet that is of the corresponding data flow and includes the data flow identifier.

The data flow corresponding to the data flow identifier refers to a data flow that includes multiple packets, and the switching node sequentially sends the packets in the data flow to the source virtual machine or the target virtual machine according to a rule. Therefore, the packets in the data flow are classified into the first packet, a middle packet, and the last packet, where receiving the first packet means appearance of a new data flow, and receiving the last packet means the end of the data flow.

A second type is that before the control device determines the silent time, the source virtual machine has not processed a packet that includes the data flow identifier, that is, after the source virtual machine receives the silent time, the packet that includes the data flow identifier and is sent by the switching node is the first packet of a new data flow for the source virtual machine.

When it is determined to send the first packet of a data flow to the source virtual machine, the control device 11 writes a data flow identifier of the data flow to a first data flow status table, where the first data flow status table includes a data flow identifier of a data flow being processed by the source virtual machine.

The control device 11 sends the first data flow status table to the switching node, and in this way, the switching node can send a subsequent packet of the data flow to the source virtual machine in a timely manner when receiving the subsequent packet of the data flow.

The control device 11 is specifically configured to send the packet to the target virtual machine according to the data flow identifier that is included in the received packet sent by the switching node and the data flow migration policy.

The data flow migration policy refers to a policy on whether the packet that is received within the silent time and is sent by the switching node is forwarded to the source virtual machine for processing or is forwarded to the target virtual machine for processing, and a policy on how to migrate memory data in the source virtual machine to the target virtual machine when the silent time ends.

Specifically, a specific rule of the policy on whether the packet that is received within the silent time and is sent by the switching node is forwarded to the source virtual machine for processing or is forwarded to the target virtual machine for processing is as follows:

It is determined whether the data flow identifier that is included in the received packet sent by the switching node exists in the first data flow status table, and if the data flow identifier exists in the first data flow status table, the received packet sent by the switching node is forwarded to the source virtual machine for processing; or if the data flow identifier does not exist in the first data flow status table, the received packet sent by the switching node is forwarded to the target virtual machine for processing.

The first data flow status table includes the data flow identifier of the data flow being processed by the source virtual machine.

Specifically, a specific rule of the policy on how to migrate memory data in the source virtual machine to the target virtual machine when the silent time ends is as follows:

When the silent time ends, the control device determines an identifier of a data flow on which processing is not completed by the source virtual machine, instructs the virtual machine monitor to copy memory data that is generated by the data flow corresponding to the determined data flow identifier and is in the source virtual machine to the target virtual machine, moves the data flow identifier to a second data flow status table, and deletes the data flow identifier from the first data flow status table.

The second data flow status table includes a data flow identifier of a data flow being processed by the target virtual machine.

The "first" and the "second" in the "first data flow status table" and the "second data flow status table" have no special meaning, and are merely used to distinguish whether a data flow corresponding to a data flow identifier included in the data flow status table is processed by the source virtual machine or the target virtual machine.

Specifically, the sending the packet to the target virtual machine according to the data flow identifier that is included in the packet and a data flow migration policy specifically includes:

Step 1: The control device 11 determines whether the data flow identifier that is included in the received packet sent by the switching node 12 exists in the first data flow status table, and if the data flow identifier does not exist in the first data flow status table, executes step 2; or otherwise, executes step 3.

Step 2: When a result of the determining is that the data flow identifier that is included in the received packet sent by the switching node does not exist in the first data flow status table, the control device 11 instructs the switching node 12 to send the packet to the target virtual machine, and a migration operation for this packet ends.

After step 2 is completed, the control device 11 may further determine whether the data flow identifier included in the packet exists in the second data flow status table, and if the data flow identifier does not exist in the second data flow status table, add the data flow identifier included in the packet to the second data flow status table.

Step 3: When a result of the determining is that the data flow identifier included in the received packet exists in the first data flow status table, the control device 11 instructs the switching node 12 to send the packet to the source virtual machine, and proceeds with step 4.

Step 4: After sending the packet to the source virtual machine, when the silent time ends, the control device 11 determines a data flow identifier corresponding to a data flow on which processing is not completed by the source virtual machine, and executes step 5.

When the silent time ends, the control device receives a packet that includes the data flow identifier and is sent by the switching node, where the data flow identifier is stored in the first data flow status table. It can be learned that the data flow corresponding to the data flow identifier belongs to the data flow on which processing is not completed by the source virtual machine.

Specifically, after the packet is sent to the source virtual machine, for the data flow in which the packet is located, there are two possibilities: Processing on a subsequent packet can be completed when the silent time ends, or processing on a subsequent packet cannot be completed when the silent time ends. When it is determined that processing on the subsequent packet of the data flow can be completed when the silent time ends, processing on the subsequent packet of the data flow is directly completed in the source virtual machine. In this way, a data flow on which processing is completed does not need to be migrated by the source virtual machine to the target virtual machine, which effectively reduces an amount of memory data migrated between the source virtual machine and the target virtual machine, reduces a quantity of memory data migrations, caused by a frequent change of the data flow, between the source virtual machine and the target virtual machine, and effectively improves a rate of migration between the source virtual machine and the target virtual machine.

Step 5: The control device 11 moves the determined data flow identifier to the second data flow status table, and instructs the virtual machine monitor to migrate memory data that corresponds to the data flow identifier and is included in the source virtual machine to the target virtual machine.

When the silent time ends, the control device receives the packet that includes the data flow identifier and is sent by the switching node; and in this case, determines whether the data flow identifier included in the received packet exists in the second data flow status table, and sends the packet to the target virtual machine when determining that the data flow identifier included in the packet exists in the second data flow status table.

In the migration system in Embodiment 1 of the present invention, a function of the control device and a function of the switching node may be implemented by two modules in a device, that is, a device includes a control module, where the control module has the function of the control device in Embodiment 1 of the present invention; and further includes a packet sending module, where the packet sending module has the function of the switching node in Embodiment 1 of the present invention.

Embodiment 2

Figure 2:
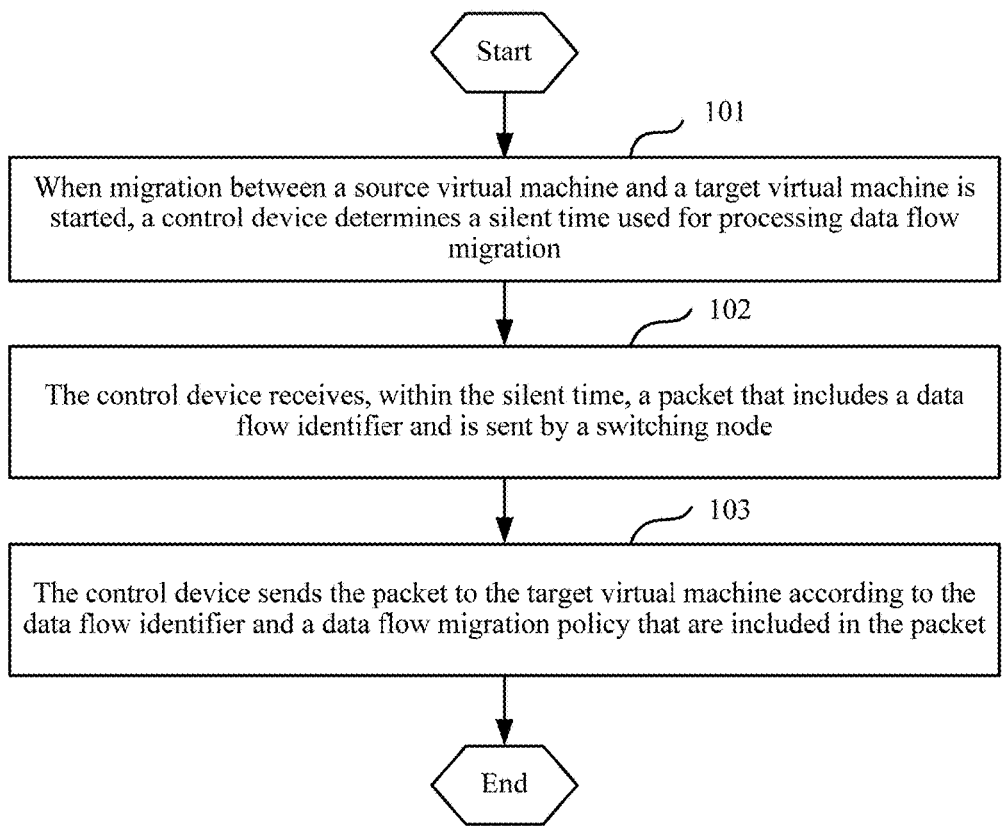
FIG. 2 is a schematic flowchart of a data flow migration method according to Embodiment 2 of the present invention.

As shown in FIG. 2, FIG. 2 is a schematic flowchart of a data flow migration method according to Embodiment 2 of the present invention. For a topology of devices in the migration method in Embodiment 2 of the present invention, refer to the data flow migration system in Embodiment 1 of the present invention. The method may be described as follows:

Step 101: When migration between a source virtual machine and a target virtual machine is started, a control device determines a silent time used for processing data flow migration.

The control device sends the determined silent time to a virtual machine monitor that manages the source virtual machine and a virtual machine monitor that manages the target virtual machine.

In step 101, when it is determined to start migration between the source virtual machine and the target virtual machine, the control device determines the silent time used for processing data flow migration. The silent time may be duration, such as 5 s or 10 s; or may be a time interval, for example, a current moment to a time point; an implementation form of the silent time is not limited herein.

The silent time may be determined according to experiment data, or may be determined according to an actual migration requirement.

After determining the silent time, the control device sends the silent time to the virtual machine monitor that manages the source virtual machine, where the virtual machine monitor that manages the source virtual machine does not execute a migration operation within the silent time, that is, does not start a push-copy operation.

Because a data flow includes a short-time data flow and a long-time data flow, when receiving the silent time, the source virtual machine waits for disconnection of a short-time connection, and eliminates metadata that is associated with the short-time data flow and is in a memory (where the metadata includes attribute information of the data flow, and after the elimination is completed, it indicates that processing on the short-time data is completed), which effectively reduces memory data that needs to be migrated.

The short-time data flow refers to a data flow on which processing can be completed within a short time, and the long-time data flow refers to a data flow on which processing needs to be completed in a longer time period.

Step 102: The control device receives, within the silent time, a packet that includes a data flow identifier and is sent by a switching node.

The data flow identifier may be one or more of a source address, a target address, a source port number, a target port number, or a protocol number of a data flow, for example, a Stream#1 or a Port80.

In step 102, the packet that includes the data flow identifier and is sent by the switching node may be classified into the following two types:

A first type is that before the silent time, the switching node has already sent the first packet of a data flow corresponding to the data flow identifier to the source virtual machine, and after the source virtual machine receives the silent time, the switching node receives a subsequent packet that is of the corresponding data flow and includes the data flow identifier.

The data flow corresponding to the data flow identifier refers to a data flow that includes multiple packets, and the switching node sequentially sends the packets in the data flow to the source virtual machine or the target virtual machine according to a rule. Therefore, the packets in the data flow are classified into the first packet, a middle packet, and the last packet, where receiving the first packet means appearance of a new data flow, and receiving the last packet means the end of the data flow.

A second type is that before the control device determines the silent time, the source virtual machine has not processed a packet that includes the data flow identifier, that is, after the source virtual machine receives the silent time, the packet that includes the data flow identifier and is sent by the switching node is the first packet of a new data flow for the source virtual machine.

When it is determined to send the first packet of a data flow to the source virtual machine, the control device writes a data flow identifier of the data flow to a first data flow status table, where the first data flow status table includes a data flow identifier of a data flow being processed by the source virtual machine, and sends the first data flow status table to the switching node, and in this way, the switching node can send a subsequent packet of the data flow to the source virtual machine in a timely manner when receiving the subsequent packet of the data flow.

Step 103: The control device sends the packet to the target virtual machine according to the data flow identifier that is included in the received packet sent by the switching node and a data flow migration policy.

In step 103, the data flow migration policy refers to a policy on whether the packet that is received within the silent time and is sent by the switching node is forwarded to the source virtual machine for processing or is forwarded to the target virtual machine for processing, and a policy on how to migrate memory data in the source virtual machine to the target virtual machine when the silent time ends.

Specifically, a specific rule of the policy on whether the packet that is received within the silent time and is sent by the switching node is forwarded to the source virtual machine for processing or is forwarded to the target virtual machine for processing is as follows:

It is determined whether the data flow identifier that is included in the received packet sent by the switching node exists in the first data flow status table, and if the data flow identifier exists in the first data flow status table, the received packet sent by the switching node is forwarded to the source virtual machine for processing; or if the data flow identifier does not exist in the first data flow status table, the received packet sent by the switching node is forwarded to the target virtual machine for processing.

The first data flow status table includes the data flow identifier of the data flow being processed by the source virtual machine.

Specifically, a specific rule of the policy on how to migrate memory data in the source virtual machine to the target virtual machine when the silent time ends is as follows:

When the silent time ends, the control device determines an identifier of a data flow on which processing is not completed by the source virtual machine, instructs the virtual machine monitor to copy memory data that is generated by the data flow corresponding to the determined data flow identifier and is in the source virtual machine to the target virtual machine, moves the data flow identifier to a second data flow status table, and deletes the data flow identifier from the first data flow status table.

The second data flow status table includes a data flow identifier of a data flow being processed by the target virtual machine.

The "first" and the "second" in the "first data flow status table" and the "second data flow status table" have no special meaning, and are merely used to distinguish whether a data flow corresponding to a data flow identifier included in the data flow status table is processed by the source virtual machine or the target virtual machine.

Specifically, the sending the packet to the target virtual machine according to the data flow identifier that is included in the packet and a data flow migration policy specifically includes:

Step 1: The control device determines whether the data flow identifier that is included in the received packet sent by the switching node exists in the first data flow status table, and if the data flow identifier does not exist in the first data flow status table, executes step 2; or otherwise, executes step 3.

Step 2: When a result of the determining is that the data flow identifier that is included in the received packet sent by the switching node does not exist in the first data flow status table, the control device instructs the switching node to send the packet to the target virtual machine, and a migration operation for this packet ends.

After step 2 is completed, the control device may further determine whether the data flow identifier included in the packet exists in the second data flow status table, and if the data flow identifier does not exist in the second data flow status table, add the data flow identifier included in the packet to the second data flow status table.

Step 3: When a result of the determining is that the data flow identifier included in the received packet exists in the first data flow status table, the control device instructs the switching node to send the packet to the source virtual machine, and proceeds with step 4.

Step 4: After sending the packet to the source virtual machine, when the silent time ends, the control device determines a data flow identifier corresponding to a data flow on which processing is not completed by the source virtual machine, and executes step 5.

When the silent time ends, the control device receives a packet that includes the data flow identifier and is sent by the switching node, where the data flow identifier is stored in the first data flow status table. It can be learned that the data flow corresponding to the data flow identifier belongs to the data flow on which processing is not completed by the source virtual machine.

Specifically, after the packet is sent to the source virtual machine, for the data flow in which the packet is located, there are two possibilities: Processing on a subsequent packet can be completed when the silent time ends, or processing on a subsequent packet cannot be completed when the silent time ends. When it is determined that processing on the subsequent packet of the data flow can be completed when the silent time ends, processing on the subsequent packet of the data flow is directly completed in the source virtual machine. In this way, a data flow on which processing is completed does not need to be migrated by the source virtual machine to the target virtual machine, which effectively reduces an amount of memory data migrated between the source virtual machine and the target virtual machine, reduces a quantity of memory data migrations, caused by a frequent change of the data flow, between the source virtual machine and the target virtual machine, and effectively improves a rate of migration between the source virtual machine and the target virtual machine.

Step 5: The control device moves the determined data flow identifier to the second data flow status table, and instructs the virtual machine monitor to migrate memory data that corresponds to the data flow identifier and is included in the source virtual machine to the target virtual machine.

When the silent time ends, the control device receives the packet that includes the data flow identifier and is sent by the switching node; and in this case, determines whether the data flow identifier included in the received packet exists in the second data flow status table, and sends the packet to the target virtual machine when determining that the data flow identifier included in the packet exists in the second data flow status table.

According to the solution in Embodiment 2 of the present invention, when it is determined to start migration between a source virtual machine and a target virtual machine, a silent time used for processing data flow migration is determined; a data flow packet sent by a switching node is received within the silent time; and the data flow packet is sent to the target virtual machine according to the data flow packet and a data flow migration policy. In this way, the silent time is used, a newly arrived data flow is redirected, and the newly arrived data flow is directly sent to the target virtual machine according to the data flow migration policy, which avoids migration of the newly arrived data flow. Therefore, data flows that arrive at the source virtual machine are on the decrease, an amount of memory data migrated between the source virtual machine and the target virtual machine is reduced, efficiency of data flow migration increases, and system migration performance is effectively improved.

Embodiment 3

Figure 3:
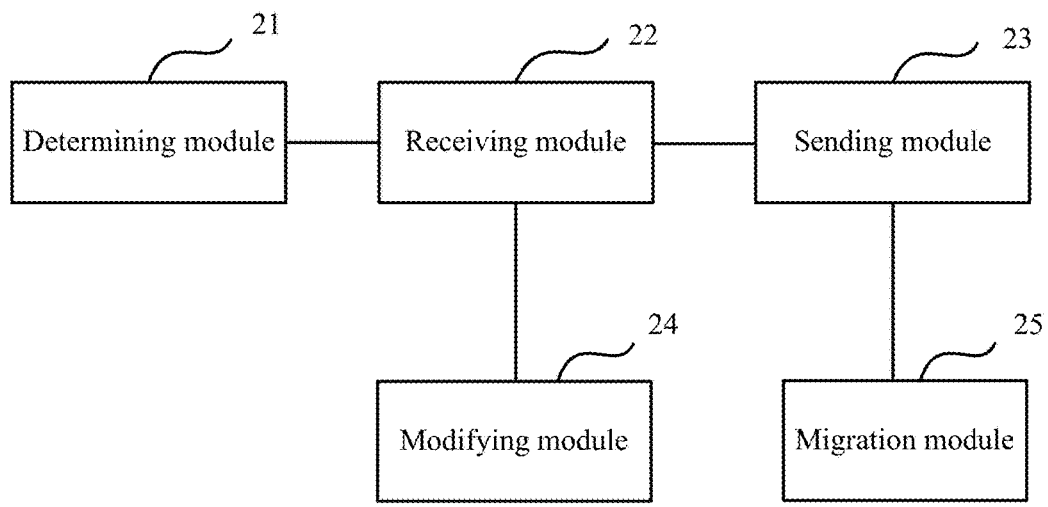
FIG. 3 is a schematic structural diagram of a data flow migration device according to Embodiment 3 of the present invention.

As shown in FIG. 3, FIG. 3 is a schematic structural diagram of a data flow migration device according to Embodiment 3 of the present invention. The device includes: a determining module 21, a receiving module 22, and a sending module 23.

The determining module 21 is configured to: when migration between a source virtual machine and a target virtual machine is started, determine a silent time used for processing data flow migration.

The receiving module 22 is configured to receive, within the silent time determined by the determining module, a packet that includes a data flow identifier and is sent by a switching node.

The sending module 23 is configured to send the packet to the target virtual machine according to the data flow identifier that is included in the packet received by the receiving module and a data flow migration policy.

The sending module 23 is specifically configured to: determine whether the data flow identifier that is included in the packet received by the receiving module exists in a first data flow status table, where the first data flow status table includes a data flow identifier of a data flow being processed by the source virtual machine; and send the packet to the target virtual machine when a result of the determining is that the data flow identifier included in the received packet does not exist in the first data flow status table.

The migration device further includes a modifying module 24.

The modifying module 24 is configured to add the data flow identifier that is included in the packet received by the receiving module to a second data flow status table, where the second data flow status table includes a data flow identifier of a data flow being processed by the target virtual machine.

The sending module 23 is further configured to send the packet to the source virtual machine when a result of the determining is that the data flow identifier that is included in the packet received by the receiving module exists in the first data flow status table.

The migration device further includes a migration module 25.

The migration module 25 is configured to: after the sending module sends the packet to the source virtual machine, when the silent time determined by the determining module ends, determine an identifier of a data flow on which processing is not completed by the source virtual machine; and move the determined data flow identifier to the second data flow status table, and migrate memory data that is associated with the data flow identifier and is included in the source virtual machine to the target virtual machine.

The migration device in Embodiment 3 of the present invention may be a combined device of the control device and the switching node in Embodiment 1 of the present invention, or may be another device that has functions of the control device and the switching node in Embodiment 1 of the present invention, which is not specifically limited herein.

Embodiment 4

Figure 4:
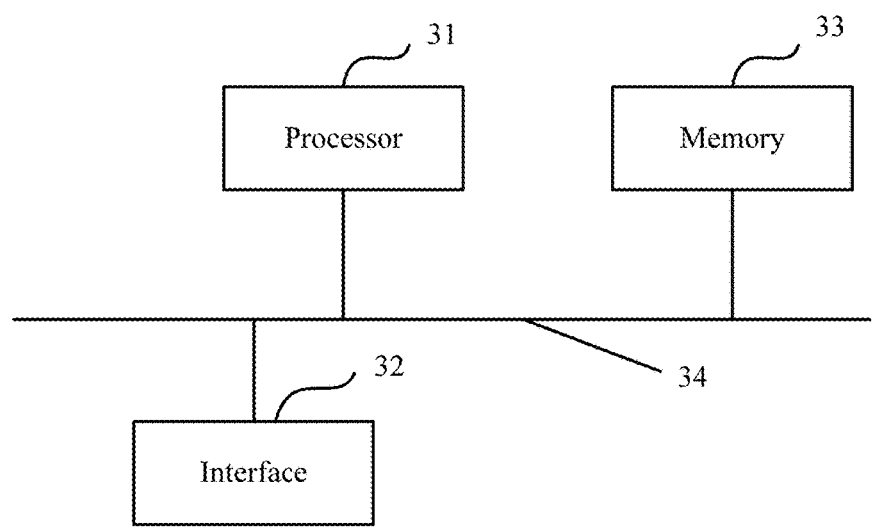
FIG. 4 is a schematic structural diagram of a server according to Embodiment 4 of the present invention.

As shown in FIG. 4, FIG. 4 is a schematic structural diagram of a server according to Embodiment 4 of the present invention. The server includes a processor 31, an interface 32, and a memory 33, where the processor 31, the interface 32, and the memory 33 are connected through a bus 34.

The processor 31 may be a CPU, or a combination of a CPU and a hardware chip.

The interface 32 may be one or more of the following: a network interface controller (NIC) that provides a wired interface, for example, an Ethernet NIC, where the Ethernet NIC may provide a copper wire and/or a fiber interface; and an NIC that provides a wireless interface, for example, a wireless local area network (WLAN) NIC.

The memory 33 is configured to store program code, and the processor 31 obtains the stored program code from the memory, and performs corresponding processing according to the obtained program code.

The memory may be a volatile memory, for example, a random-access memory (RAM); or a non-volatile memory, for example, a read-only memory (ROM), a flash memory, a hard disk drive (HDD), or a solid-state drive (SSD); or any combination of memories of the foregoing types.

Specifically, that the processor 31 executes the program stored in the memory 33 to implement a data flow migration method provided in an embodiment of the present invention includes:

when migration between a source virtual machine and a target virtual machine is started, determining a silent time used for processing data flow migration; receiving, by using the interface 32 within the silent time, a packet that includes a data flow identifier and is sent by a switching node; and sending the packet to the target virtual machine by using the interface 32 according to the data flow identifier that is included in the received packet and a data flow migration policy.

The processor 31 is specifically configured to: determine whether the data flow identifier that is included in the received packet exists in a first data flow status table, where the first data flow status table includes a data flow identifier of a data flow being processed by the source virtual machine;

send the packet to the target virtual machine when a result of the determining is that the data flow identifier included in the received packet does not exist in the first data flow status table; and send the packet to the source virtual machine when a result of the determining is that the data flow identifier that is included in the received packet exists in the first data flow status table.

The processor 31 is further configured to add the data flow identifier that is included in the received packet to a second data flow status table, where the second data flow status table includes a data flow identifier of a data flow being processed by the target virtual machine.

The processor 31 is further configured to: after sending the packet to the source virtual machine, when the silent time ends, determine an identifier of a data flow on which processing is not completed by the source virtual machine; and move the determined data flow identifier to the second data flow status table, and migrate memory data that is associated with the data flow identifier and is included in the source virtual machine to the target virtual machine.

In addition, the memory 33 further stores the first data flow status table and the second data flow status table.

Persons skilled in the art should understand that the embodiments of the present invention may be provided as a method, an apparatus, or a computer program product. Therefore, the present invention may use a form of hardware only embodiments, or embodiments with a combination of software and hardware. Moreover, the present invention may use a form of a computer program product that is implemented on one or more computer-usable storage medium products that include computer-usable program code.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the present invention without departing from the scope of the present invention. The present invention is intended to cover these modifications and variations provided that they fall within the scope of protection defined by the following claims and their equivalent technologies.

What is claimed is:

1. A data flow migration method, comprising:
    when migration between a source virtual machine and a target virtual machine is started, determining a silent time used for processing data flow migration;
    receiving, within the silent time, a packet that comprises a data flow identifier and is sent by a switching node;
    adding the data flow identifier comprised in the packet to a second data flow status table, wherein the second data flow status table comprises a data flow identifier of a data flow being processed by the target virtual machine;
    moving an identifier of a data flow on which processing is not completed by the source virtual machine to the second data flow status table, and migrating memory data that is associated with the data flow identifier and is comprised in the source virtual machine to the target virtual machine, when the silent time ends; and
    sending the packet to the target virtual machine according to the data flow identifier that is comprised in the received packet and a data flow migration policy.

2. The migration method according to claim 1, wherein the sending the packet to the target virtual machine according to the data flow identifier that is comprised in the received packet and a data flow migration policy comprises:
    sending the packet to the target virtual machine when the data flow identifier comprised in the received packet does not exist in a first data flow status table, wherein the first data flow status table comprises a data flow identifier of a data flow being processed by the source virtual machine.

3. The migration method according to claim 2, wherein the method further comprises:
    sending the packet to the source virtual machine when the data flow identifier comprised in the received packet exists in the first data flow status table.

4. A device, comprising:
    a processor; and
    a network interface controller (NIC), wherein the processor is configured to:
        determine a silent time used for processing data flow migration, when migration between a source virtual machine and a target virtual machine is started;
        receive, using the NIC within the silent time, a packet that comprises a data flow identifier and is sent by a switching node;
        add the data flow identifier that is comprised in the received packet to a second data flow status table, wherein the second data flow status table comprises a data flow identifier of a data flow being processed by the target virtual machine;
        move an identifier of a data flow on which processing is not completed by the source virtual machine to the second data flow status table, and migrate memory data that is associated with the data flow identifier and is comprised in the source virtual machine to the target virtual machine, when the silent time ends; and
        send, using the NIC, the packet to the target virtual machine according to the data flow identifier that is comprised in the received packet and a data flow migration policy.

5. The device according to claim 4, wherein
the processor is configured to: send, using the NIC, the packet to the target virtual machine when the data flow identifier comprised in the received packet does not exist in a first data flow status table, wherein the first data flow status table comprises a data flow identifier of a data flow being processed by the source virtual machine.

6. The device according to claim 5, wherein
the processor is further configured to send, using the NIC, the packet to the source virtual machine when the data flow identifier that is comprised in the received packet exists in the first data flow status table.

* * * * *